Feb. 23, 1960

R. B. WATROUS 2,925,745

SPAN ADJUSTMENT LINKAGE

Filed Nov. 13, 1957

INVENTOR.
ROBERT B. WATROUS
BY
ATTORNEY.

United States Patent Office 2,925,745
Patented Feb. 23, 1960

2,925,745

SPAN ADJUSTMENT LINKAGE

Robert B. Watrous, Philadelphia, Pa., assignor to Minneapolis-Honeywell Regulator Company, Minneapolis, Minn., a corporation of Delaware Application November 13, 1957, Serial No. 696,207

9 Claims. (Cl. 74—516)

This invention relates to a span adjustment linkage and particularly to a span adjustment linkage for varying the ratio of input force to output force in the system defined by said linkage.

In many types of measuring devices, mechanical means are needed to vary the ratio of input and output forces associated with said means. For instance, in systems for controlling valves, the settings of the control system often should be varied and these variations can be achieved by varying the ratio of the input force to the system to the output force from the system. Variations in the ratio of the input to the output forces in a control device may also be employed to compensate for temperature variations. Many other practical applications are known wherein linkages which adjust the ratio of input to output forces are useful.

The main object of the present invention is to provide an improved means for varying the ratio of input and output forces in a system of links.

Another object of the present invention is to provide a span adjustment linkage having a pivotally movable floating member which adjusts the ratio of input and output forces in the system by having said floating member pivoted to various positions.

A better understanding of the present invention may be had from the following detailed description when read in connection with the accompanying drawings in which.

Figure 1:
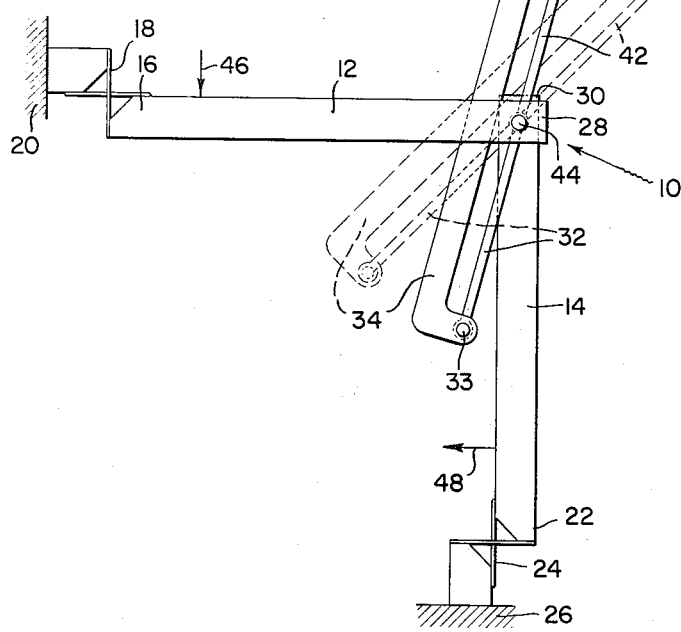
Fig. 1 is a side elevational view of a span adjustment linkage embodying the present invention showing the floating member in two different positions.
Figure 2:
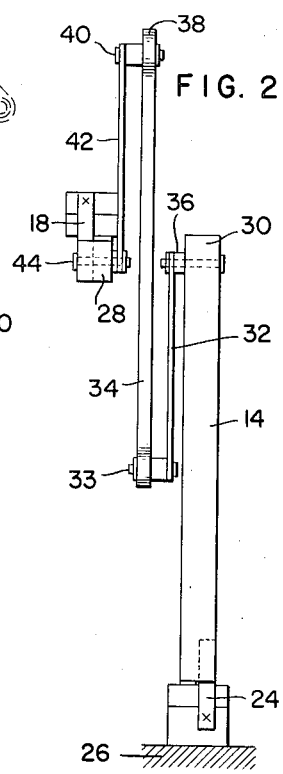
Fig. 2 is an end view of the linkage shown in Fig. 1.

Referring now to the drawings in detail, the span adjustment linkage embodying the present invention is generally designated by the reference numeral 10. Span adjustment linkage 10 comprises a horizontal beam 12 and a vertical beam 14. Horizontal beam 12 has fixed to one end 16 a spring pivot 18 which is connected to a relatively fixed object 20 such as, for instance, a meter case. Vertical beam 14 has fixed to its end 22 a spring pivot 24 which is also fixed to a relatively stationary object 26. Object 26 may be the same as object 20, i.e. the meter case, or it may be a different object which is fixed relative to the object 20. The free ends 28 and 30 of the beams 12 and 14, respectively, are in overlying relation so that the beams are skewed relative to one another. Pivotally connected to the free end 30 of vertical beam 14 by way of pivot member 36 is a link 32 which in turn is pivotally connected at its other end by way of pivot member 33 to a link 34, here shown in the form of a channel. Link 34 is arranged symmetrically about pivot 36 and is pivotally connected at its upper end 38 by a pivot means 40 to another link 42. The opposite or lower end of link 42 is in turn pivotally connected to the free end 28 of beam 12 by way of a pivot member 44.

The pivot member 44 together with pivot member 36 defines a line which is perpendicular to and intersects the longitudinal axes of vertical and horizontal beams 12 and 14. Accordingly, link 34 is arranged symmetrically about both pivots 36 and 44.

For the purposes of explanation, it will be assumed that an input force is applied to the beam 12 in the direction and at the point shown by the arrow 46 and the output force of the linkage is put out therefrom in the direction and at the position shown by the arrow 48. It will, of course, be understood that the input force could be applied to the vertical beam 14 and the output force can be exerted by the horizontal beam 12. Moreover, the directions of these forces would in this latter instance be reversed. Further, the magnitude of the output force will be dependent upon the position of floating link 34, as will be understood as this description proceeds. It will be understood that the input force 46 can be applied by a pressure sensitive bellows 50 such as is shown in the force balanced fluid system of Fig. 3 by a rotor from a galvanometer or by any other sensing device which manifests an application of force upon the change of condition being measured.

Regardless of what the source of the input force 46 is, with this force applied to beam 12 a vertical downward force will be applied to the link 42 through the pivot 44 connecting the link 42 to the horizontal beam 12. Since the link 42 is a two-force tension member, the vertical force equal to force 46 will be converted into a tension force equal to the force 46 divided by the cosine of the angle defined by link 42 and a vertical line, which force will be applied in a direction co-linear with member 42. The force applied to the link 42 will be transferred to the link 34 through the pivot connection 40 in the same direction as it is applied to link 42. Through pivot 33 this same force will be applied to link 32. With link 42 being pivotally connected by pivot member 36 to the vertical member 14, the force equal to force 46 divided by the cosine of the angle will be applied to vertical beam 14. The vertical component of the force applied to vertical beam 14, which is less than the force 46, due to the difference in their moment arms, will be equalized by an upward force exerted by the spring pivot 24. The horizontal component of the force, however, will be the force 48, which force will be equal to force 46 times the tangent of the angle between the link 32 or 42 and the vertical axis.

From the foregoing analysis, it will be seen that by changing the angular disposition of the floating link 34 and its connecting links 32 and 42, the magnitude of the output force 48 may be varied for any applied input force 46. For instance, if the links 32, 34 and 42 are all vertically disposed, then the output force 48 will be zero. However, as the angle between the links 32, 34 and 42 and the vertical increases with link 34 disposed as shown in the dotted line position shown in Fig. 1 the output force 48 will increase in accordance with the tangent relationship heretofore defined. Anyone skilled in the art can determine the relative directions and variations in ratios between input and output forces with member 34 disposed in other positions by applying the mathematical relationships set forth above.

It is to be noted that the floating link 34 is independently operatively pivotally connected to the horizontal beam 12 and the vertical beam 14 by the links 42 and 32 respectively. By providing the independent pivots which are aligned as heretofore described, the force required to move link 34 from its solid to dotted line position shown in Fig. 1 may be very small. Accordingly, a temperature sensitive element such as a thermostatic element may be caused to operatively engage the link 34 to pivot it and thereby compensate for temperature variations elsewhere in the system and thus maintain a proper or predetermined relationship between input force 46 and output force 48. Moreover, with the independent pivots 36 and 44 aligned, pivotal movement of the floating linkages 32, 34, and 42 does not impart any movement to the beams 12 and 14 and thereby maintains the system stationary regardless of the position of the floating linkage assembly.

Upon the occurrence of an increase in the force 46, that is applied in the form of a pressure acting through the bellows 50 on the beam 12, the beam 12 will move slightly in a downward direction to a position that is closer to the face of the nozzle 52. This beam action will in turn cause the level of the fluid supply pressure in the portion 54 of a conventional restricted fluid pressure supply conduit 56, 58 to increase. This increase in fluid pressure will in turn be transmitted from the conduit portion 54 by way of conduit portion 60 to a pilot valve 62. This action will cause the level of the fluid pressure in the outlet conduit 64 of the pilot valve 62 to increase. As the pressure in conduit 64 increases this pressure increase will be simultaneously applied by way of the feedback bellows 66 to the vertical beam 14 and by way of the transmitting conduit 68 to a control element such as the head of the control valve in a flow line, not shown.

In a similar but reverse manner to that just described it can be seen that if this force 46 on the beam 12 is reduced the pressure being transmitted by way of conduit 68 to the control element will be reduced and that the force being applied by the feedback bellows will be reduced.

It can thus be seen that with this feedback bellows arrangement to force balance any input force 46 that is being applied to the horizontal beam 12 the beam 12 motion with respect to the face of the nozzle 52 will be infinitesimal. Furthermore it can also be readily seen that the link 70 may be used with the linkage 10 to alter the angular position of the link 34 so that a different force ratio can be set up between the input force 46 and a resulting output force 48 that is being bucked out by way of the bellows 66.

Figure 3:
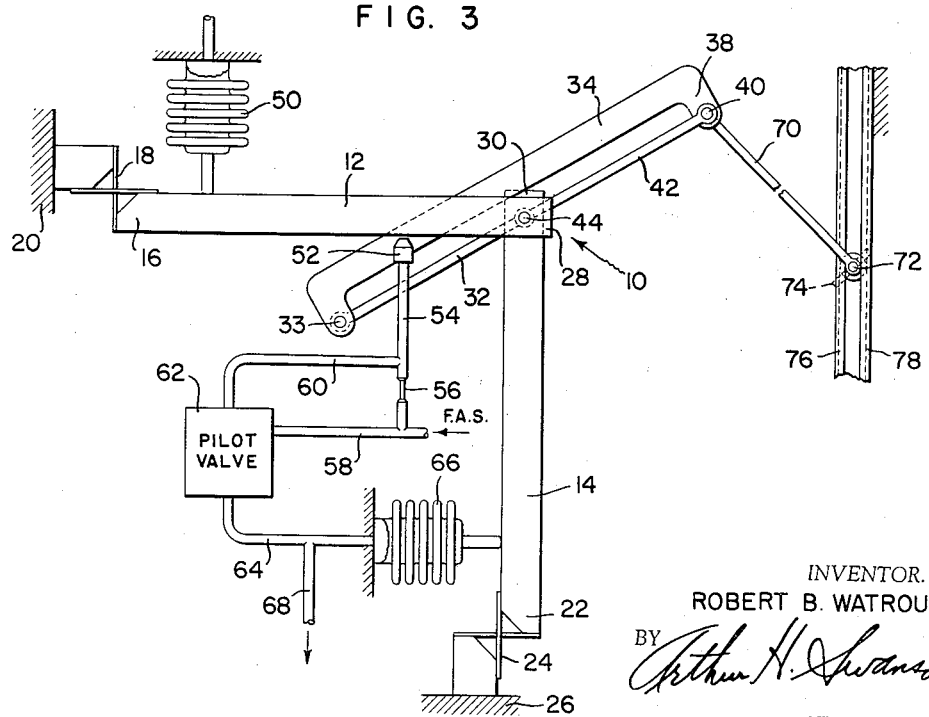
Fig. 3 shows how the span adjusting linkage shown in Fig. 1 may be employed in a force balance system.

Fig. 3 shows this link 70 pivotally mounted at one of its ends to the underside of pivot member 40 and its other end being pivotally mounted to one end of a wrist pin 72 that in turn has its inner end fixedly attached by means of a wingnut 74 to a stationary grooved out slide number 76, 78. By loosening the wingnut 74 the pivot member 72 may be slid along the slide member 76, 78 in an up or down direction from the position shown and then locked in this selected up or down position. It can further be seen that if the wrist pin is moved to a selected position that is above the position shown in the drawing the link 34 will be caused to move in a counterclockwise direction about the pivot 44 as a change to that new selected position takes place. In a similar but reverse manner the link 34 will be caused to move in a clockwise direction about the pivot 44 if the change in wrist pin 72 position is to a position that is lower than that presently shown in the drawing.

It is evident that such a movable link arrangement 70—78 will provide a means of adjusting the link 34 of linkage 10 to some desired position in which the input force 46 is at some predetermined selected value to the output force 48, as previously described. With this arrangement a predetermined incremental change in output fluid pressure may be transmitted to a final control member by way of conduit 68 for each incremental change in the magnitude of the force 46.

The linkage disclosed in this application is thus useful in varying the span or the ratio of input and output forces applied to the linkage 10 by providing the linkage with a pivotally movable floating member that may be pivoted to various positions.

What is claimed is:

1. Means for varying the ratio of input to output forces, comprising first and second longitudinally extending members disposed at an angle to one another, a stationary spring pivot connected to one end of each of said members first and second links pivotally connected to said first and second members, respectively at their other end, the pivot between said first member and said first link and the pivot between said second member and said second link defining a line which is perpendicular to and intersects the longitudinal axes of both said first and second members, said first and second links being parallel and extending in opposite directions away from their respective pivots, a third link pivotally connected to said first and second links adjacent their free ends and said third link being pivotally movable about said line extending through the pivots between said first member and said first link and said second member and said second link, whereby the ratio between a force applied to said first member and the resulting force exerted by said second member may be varied by pivotally moving said third link.

2. Means for varying the ratio of input to output forces, comprising first and second longitudinally extending members disposed at an angle to one another, a stationary spring pivot connected to one end of each of said members first and second links pivotally connected to said first and second members, respectively at their other end, the pivot between said first member and said first link and the pivot between said second member and said second link defining a line which is perpendicular to and intersects the longitudinal axes of both said first and second members, said first and second links being parallel and extending in opposite directions away from their respective pivots, a third link pivotally connected to said first and second links adjacent their free ends and said third link being pivotally movable about said line extending through the pivots between said first member and said first link and said second member and said second link, whereby the ratio between a force applied to said first member and the resulting force exerted by said second member may be varied by pivotally moving said third link a fourth link means pivotally connected at one of its ends to said third link and at its other end to an adjustably mounted stationary slide member and wherein movement of a wrist pin along said slide effects a pivotal movement of said third link.

3. Means for varying the ratio of input to output forces, comprising first and second longitudinally extending members disposed at an angle to one another, first and second links pivotally connected to said first and second members, respectively, the pivot between said first member and said first link and the pivot between said second member and said second link defining a line which is perpendicular to and intersects the longitudinal axes of both said first and second members, first and second spring pivots mounting the ends of said first and second members, respectively, remote from the pivots between said first member and said first link and said second member and said second link, respectively, said first and second links being parallel and extending in opposite directions away from their respective pivots, a third link pivotally connected to said first and second links adjacent their free ends and said third link being pivotally movable about said line extending through the pivots between said first member and said first link and said second member and said second link, whereby the ratio between a force applied to said first member and the resulting force exerted by said second member may be varied by pivotally moving said third link.

4. Means for varying the ratio of input to output forces, comprising first and second longitudinally extending members disposed at right angles to one another, a stationary spring pivot connected to one end of each of said members first and second links pivotally connected to said first and second members, respectively at their other end, the pivot between said first member and said first link and the pivot between said second member and said second link defining a line which is perpendicular to and intersects the longitudinal axes of both said first and second members, said first and second links being parallel and extending in opposite directions away from their respective pivots, a third link pivotally connected to said first and second links adjacent their free ends and said third link being pivotally movable about said line extending through the pivots between said first member and said first link and said second member and said second link, whereby the ratio between a force applied to said first member and the resulting force exerted by said second member may be varied by pivotally moving said third link.

5. Means for varying the ratio of input to output forces, comprising first and second longitudinally extending members disposed at right angles to one another, first and second links pivotally connected to said first and second members, respectively, the pivot between said first member and said first link and the pivot between said second member and said second link defining a line which is perpendicular to and intersects the longitudinal axes of both said first and second members, first and second spring pivots mounting the ends of said first and second members, respectively, remote from the pivots between said first member and said first link and said second member and said second link, respectively, said first and second links being parallel and extending in opposite directions away from their respective pivots, a third link pivotally connected to said first and second links adjacent their free ends and said third link being pivotally movable about said line extending through the pivots between said first member and said first link and said second member and said second link, whereby the ratio between a force applied to said first member and the resulting force exerted by said second member may be varied by pivotally moving said third link.

6. Means for varying the ratio of input to output forces, comprising first and second longitudinally extending members disposed at right angles to one another, a stationary spring pivot connected to one end of each of said members first and second links pivotally connected to said first and second members, respectively at their other end, the pivot between said first member and said first link and the pivot between said second member and said second link defining a line which is perpendicular to and intersects the longitudinal axes of both said first and second members, respectively, remote from the pivots between said first member and said first link and said second member and said second link, respectively, said first and second links being parallel and extending in opposite directions away from their respective pivots, a third link pivotally connected to first and second links adjacent their free ends and said third link being disposed symmetrically with relation to said line extending through the pivots between said first member and said first link and said second member and said second link and being pivotally movable about said line, whereby the ratio between a force applied to said first member and the resulting force exerted by said second member may be varied by pivotally moving said third link.

7. Means for varying the ratio of input to output forces, comprising first and second longitudinally extending members disposed at right angles to one another, a stationary spring pivot connected to one end of each of said members first and second links pivotally connected to said first and second members, respectively at their other end, the pivot between said first member and said first link and the pivot between said second member and said second link defining a line which is perpendicular to and intersects the longitudinal axes of both said first and second members, respectively, remote from the pivots between said first member and said first link and said second member and said second link, respectively, said first and second links being parallel and extending in opposite directions away from their respective pivots, a third link pivotally connected to said first and second links adjacent their free ends and said third link being disposed symmetrically with relation to said line extending through the pivots between said first member and said first link and said second member and said second link and being pivotally movable about said line, whereby the ratio between a force applied to said first member in a direction parallel to said second member and the resulting force exerted by said second member in a direction parallel to said first member may be varied by pivotally moving said third link.

8. Means for varying the ratio of input to output forces, comprising a horizontal longitudinally extending member, a first spring pivot connected to one end of said horizontal member for connecting said one end to a relatively fixed object, a vertical longitudinally extending member, a second spring pivot connected to one end of said vertical member for connecting said one end to an object fixed relative to said first mentioned object, the free ends of said horizontal and vertical members being in side-by-side relation, a first link pivotally connected to said horizontal member adjacent the latter's free end, a second link pivotally connected to said vertical member adjacent the latter's free end, said first and second links being parallel and extending in opposite directions away from their respective pivots, the line defined by the pivot between said horizontal member and said first link and the pivot between said vertical member and said second link being perpendicular to both said horizontal and vertical members, and a third link disposed symmetrically relative to said last mentioned line and being pivotally connected to both said first and second links and being pivotally movable about said line, whereby the ratio between a force applied to said horizontal member and the resulting force exerted by said vertical member may be varied by pivotally moving said third link.

9. Means for varying the ratio of input to output forces, comprising a horizontal longitudinally extending member, a first spring pivot connected to one end of said horizontal member for connecting said one end to a relatively fixed object, a vertical longitudinally extending member, a second spring pivot connected to one end of said vertical member for connecting said one end to an object fixed relative to said first mentioned object, the free ends of said horizontal and vertical members being in side-by-side relation, a first link pivotally connected to said horizontal member adjacent the latter's free end, a second link pivotally connected to said vertical member adjacent the latter's free end, said first and second links being parallel and extending in opposite directions away from their respective pivots, the line defined by the pivot between said horizontal member and said first link and the pivot between said vertical member and said second link being perpendicular to both said horizontal and vertical members, and a third link disposed symmetrically relative to said last mentioned line and being pivotally connected to both said first and second links and being pivotally movable about said line, whereby the ratio between a vertical force applied to said horizontal member and the resulting horizontal force exerted by said vertical member may be varied by pivotally moving said third link.

References Cited in the file of this patent

UNITED STATES PATENTS

| | | |
|---|---|---|
| 1,962,324 | Noble | June 12, 1934 |
| 2,050,965 | De Giers | Aug. 11, 1936 |
| 2,268,549 | Kennedy | Jan. 6, 1942 |
| 2,352,955 | Johnson | July 4, 1944 |

FOREIGN PATENTS

| | | |
|---|---|---|
| 759,815 | Germany | Mar. 9, 1953 |